United States Patent
Inchingolo et al.

(10) Patent No.: US 7,594,227 B2
(45) Date of Patent: Sep. 22, 2009

(54) DEPENDENCY GRAPH PARAMETER SCOPING

(75) Inventors: Frank Inchingolo, Edwardville, IL (US); Craig W. Stanfill, Lincoln, MA (US)

(73) Assignee: Ab Initio Technology LLC, Lexington, MA (US)

( * ) Notice: Subject to any disclaimer, the term of this patent is extended or adjusted under 35 U.S.C. 154(b) by 990 days.

(21) Appl. No.: 10/795,374

(22) Filed: Mar. 8, 2004

(65) Prior Publication Data
US 2005/0257221 A1 Nov. 17, 2005

(51) Int. Cl.
G06F 9/46 (2006.01)
G06F 9/44 (2006.01)
G06F 9/30 (2006.01)

(52) U.S. Cl. .............. 718/100; 719/331; 712/216

(58) Field of Classification Search ............. 719/310, 719/331, 332; 718/100; 706/45; 345/440; 712/216
See application file for complete search history.

(56) References Cited

U.S. PATENT DOCUMENTS

| | | | | |
|---|---|---|---|---|
| 4,893,234 A | * | 1/1990 | Davidson et al. | 712/27 |
| 5,202,987 A | * | 4/1993 | Bayer et al. | 718/102 |
| 5,442,791 A | * | 8/1995 | Wrabetz et al. | 719/330 |
| 5,617,510 A | * | 4/1997 | Keyrouz et al. | 706/45 |
| 5,929,864 A | * | 7/1999 | Picott et al. | 345/440 |
| 6,263,358 B1 | | 7/2001 | Lee et al. | |
| 6,480,876 B2 | | 11/2002 | Rehg et al. | |
| 6,490,611 B1 | | 12/2002 | Shen et al. | |
| 6,574,788 B1 | * | 6/2003 | Levine et al. | 716/18 |
| 6,675,189 B2 | | 1/2004 | Rehg et al. | |
| 7,152,157 B2 | * | 12/2006 | Murphy et al. | 713/100 |
| 2003/0149714 A1 | | 8/2003 | Casati et al. | |

OTHER PUBLICATIONS

Control-M; New Dimension Software. *User Manual*. New Dimension Software Ltd., 1999.
Romberg, M., "Unicore: Beyond Web-based Job-Submission", Proceedings of the $42^{nd}$ Cray User Group Conference, Noordwijk (May 22-26, 2000).
"Unicenter AutoSys Job Management", Computer Associates, , Copyright 2001.
International Search Report, Patent Cooperation Treaty, International Application No. PCT/US05/07923, Sep. 15, 2006, 9 pages.

* cited by examiner

*Primary Examiner*—Van H Nguyen
(74) *Attorney, Agent, or Firm*—Fish & Richardson P.C.

(57) ABSTRACT

A number of tasks are defined according to a dependency graph. Multiple parameter contexts are maintained, each associated with a different scope of the tasks. A parameter used in a first of the tasks is bound to a value. This binding includes identifying a first of the contexts according to the dependency graph and retrieving the value for the parameter from the identified context.

22 Claims, 9 Drawing Sheets

DEPENDENCY GRAPH PARAMETER SCOPING

BACKGROUND

This invention relates to scoping of parameters in a dependency graph.

Computer job control systems have been used to sequence execution of computer programs or other processes according to constraints related to the order in which the programs are to be executed. One approach to specifying the ordering constraints is using a dependency graph. The programs may accept arguments that are specified at the time jobs are submitted to the system. One example of such job control systems is a distributed batch systems in which different jobs can be specified to execute on different computers or types of computers (e.g., supercomputers), and dependencies between different jobs are explicitly identified before the jobs are executed. One approach to communication of information between jobs is through a common data store such as through files in a file system. Another example of such job control relates to job scheduling in a distributed personal computer environment, for example, scheduling maintenance tasks that need to be executed on different computers in a particular sequence.

SUMMARY

In a general aspect, the invention features a method for binding values of parameters. A number of tasks are defined according to a dependency graph. Multiple parameter contexts are maintained, each associated with a different scope of the tasks. A parameter used in a first of the tasks is bound to a value. This binding includes identifying a first of the contexts according to the dependency graph and retrieving the value for the parameter from the identified context.

This aspect can include one or more of the following features:

A value for assignment to a parameter is determined during execution of a second of the tasks. The value for the parameter is stored in the first parameter context, which is associated with the second of the tasks.

The dependency graph specifies an execution order for the tasks. Identifying the first of the contexts includes identifying tasks that necessarily execute prior to the first of the tasks. Identifying the first of the contexts also includes identifying tasks that assign a value to the first parameter and identifying a task that executes latest according to the dependency graph.

In another aspect, in general, the invention features a method for checking parameter access including accepting a specification of an ordering constraint for a plurality of tasks, in which at least some of the tasks are not ordered relative to one another. This checking includes, for each of one or more parameters, identifying the tasks that access those parameters, and checking for potential conflict in the access to the parameters by the identified tasks according to the specification of the ordering constraint.

Aspects of the invention can include one or more of the following advantages:

Use of explicit parameter passing between tasks enables checking for conflicts and ambiguities in parameter values. For example, such checking can ensure that parameters will take on the same values on repeated execution of a plan of tasks.

Scoping according to precedence in a dependency graph can be preferable to scoping according to nesting or plans and sub-plans because parameters can be passed between peer tasks in the plans.

Use of multiple parameter contexts can reduce name conflict by allowing the same parameter name to be used in different portions of a dependency graph subject to the multiple uses not introducing conflicts or ambiguities according to the scoping rules. This can allow different developers to author different portions of a plan without introducing name conflicts, and without having to explicitly identify different naming domains.

Other features and advantages of the invention are apparent from the following description, and from the claims.

DESCRIPTION

1 Overview

Figure 1:
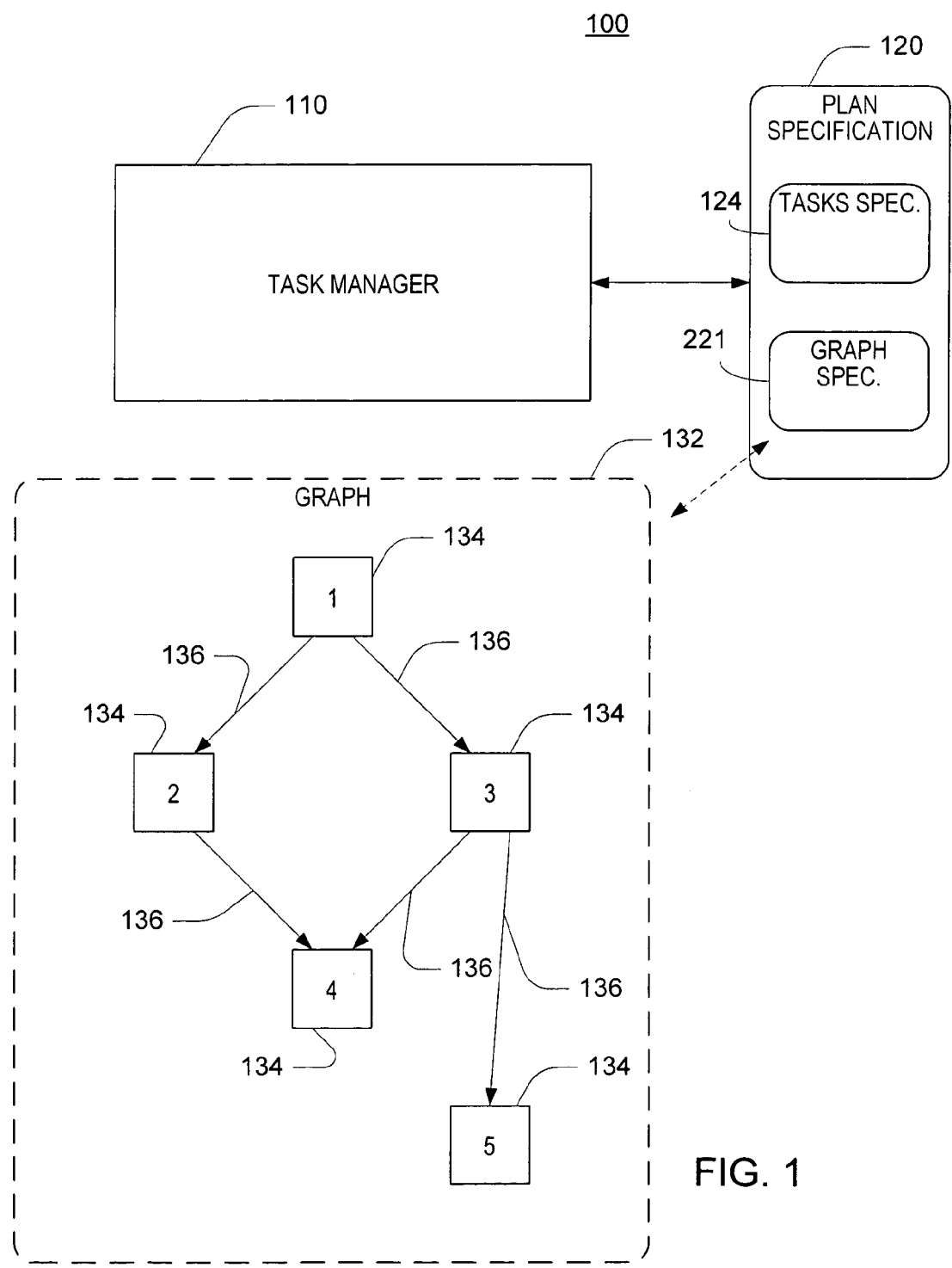
FIG. 1 is a task management system.

Referring to FIG. 1, a task management system 100 controls the execution of tasks that make up an overall plan according to dependency constraints which specify which tasks in the plan must be completed before others of the tasks are executed. The dependency constraints are represented using a directed dependency graph 132 in which each node 134 of the graph corresponds to a different task in the plan and each directed arc 136 from one node to another indicates an ordering constraint such that the task corresponding to the first ("upstream") node must complete before the task corresponding to the second ("downstream") node is executed. More generally, a task corresponding to a node can execute only after all its upstream tasks in the graph have completed. The dependency graph establishes a partial ordering of the tasks. Therefore, tasks may be executed concurrently subject to constraints including the graph-based dependency constraints. Tasks may also be executed on different computers to achieve a parallelism speedup in overall execution of the plan.

Task management system 100 includes a task manager 110, which reads a plan specification 120. The plan specification includes a graph specification 122 defining the dependency graph 132, as well as a tasks specification 124 that defines the characteristics of each of the tasks. Graph specification 122 defines the dependency graph by a list of nodes 134, and a list of arcs 136 each identifying a source node and a destination node in the graph. Each node is associated with a task definition, which is specified in tasks specification 124, that specifies the specific operations to be carried out in the task.

A task can be defined using a task template and a plan can be defined using a plan template. A template for a task or a plan can include references to parameters that are represented symbolically and are not necessarily bound to values until the task is executed. For example, a task template may include a reference to a parameter named FILENAME, and a reference to that parameter, represented using a "dollar-sign" syntax $FILENAME, is bound to a specific value by the task manager 110 prior to or during execution of the task.

Some parameters are global to the entire plan and are assigned values when the entire plan is first executed. Such parameters can be formal parameters of the plan as a whole and may, for example, be specified in the command that invokes the overall plan or can be elicited interactively from a user who invokes the plan.

Other parameters do not necessarily have values specified when the plan is first executed. Such dynamic parameters may be assigned values during or as a result of execution of one or more tasks and then referenced by the templates of other tasks. For example, in FIG. 2, a parameter A can be set to a value by task 1, and then that value can be used by task 2.

Task management system 100 supports a number of additional features that are relevant to the discussion below. A first feature is that a node 134 may be associated with an entire "sub-plan" rather than a single task. A sub-plan is a lower-level plan of partially ordered tasks. The sub-plan has a plan specification 120 of the same or similar structure as the top-level plan specification.

A second feature is that tasks have the ability to modify plan specification 120 through their execution. In particular, a task has the ability to add additional nodes 134 and arcs 136 to graph 132, and define characteristics for the tasks associated with the added nodes using services provided by the task manager 110. For example, a first task can generate a sub-plan using a template for a plan having unknown (before runtime) number of tasks to perform. The number of tasks in the template is bound at runtime using a dynamic parameter. The generated sub-plan is incorporated into the higher-level plan of the first task by the task manager 110.

2 Binding Approaches

Task manager 110 uses one of a number of alternative approaches to parameter binding as described below. Alternatively, the task manager 110 uses a combination of the binding approaches, for example, using different approaches for different parameters according to declarations of those parameters. One aspect in which some (or all) of the approaches differ is in the scope of parameter definitions.

2.1 Approach 1

Figure 3:
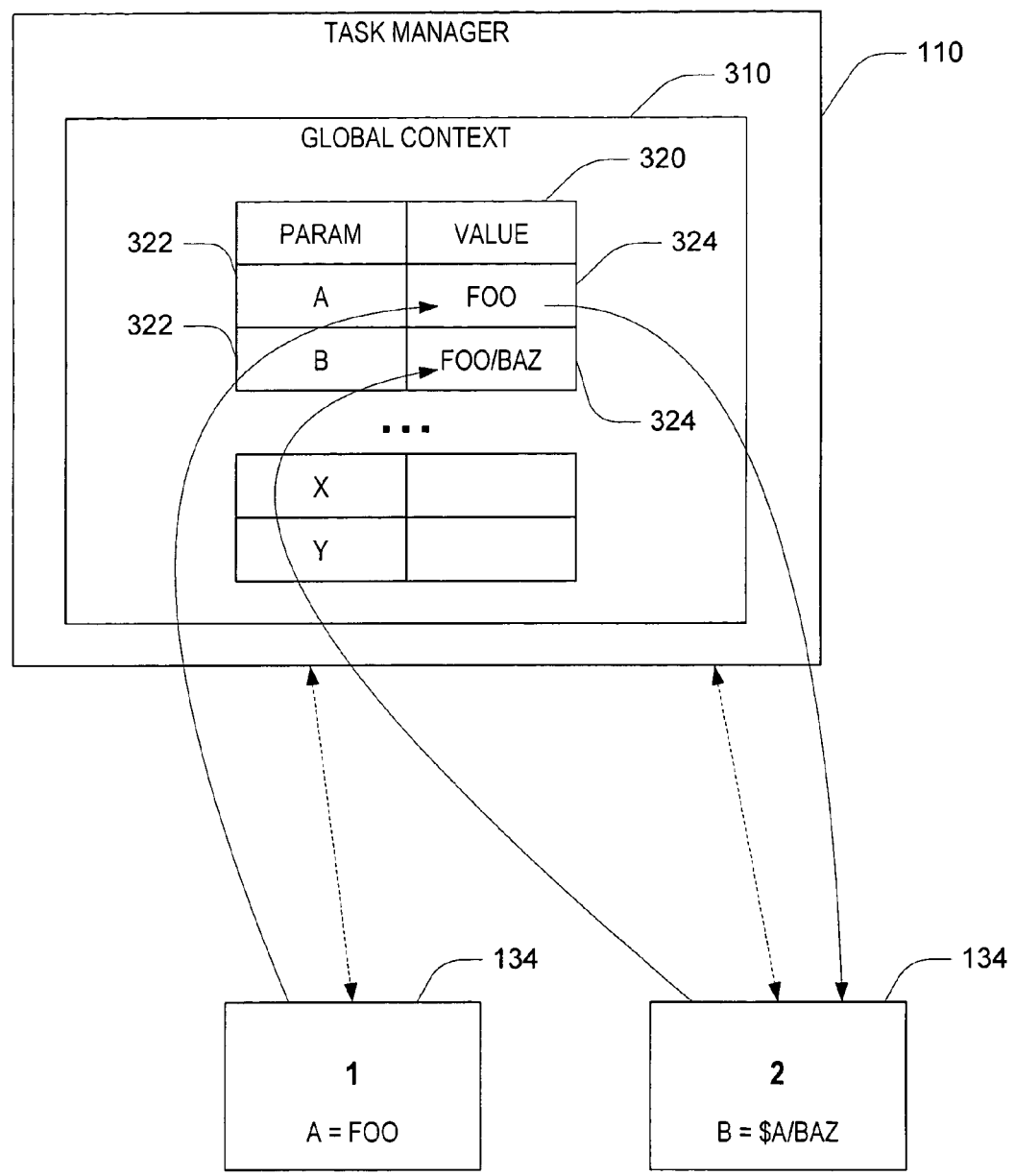
FIG. 3 is a diagram that includes a single global context in a task manager.

Referring to FIG. 3, in a first binding approach, task manager 110 maintains a single global context 310 for all parameters. The task manager 110 maintains a single copy of any parameter. That is, it maintains a data structure 320 that associates each of a number of different parameter names 322 with a current value 324 of that parameter (where a value 324 can be empty if the corresponding parameter has not yet been assigned a value). This same data structure 320 can be used to hold values of global parameters as well as those dynamically assigned by tasks as they execute.

Figure 2:
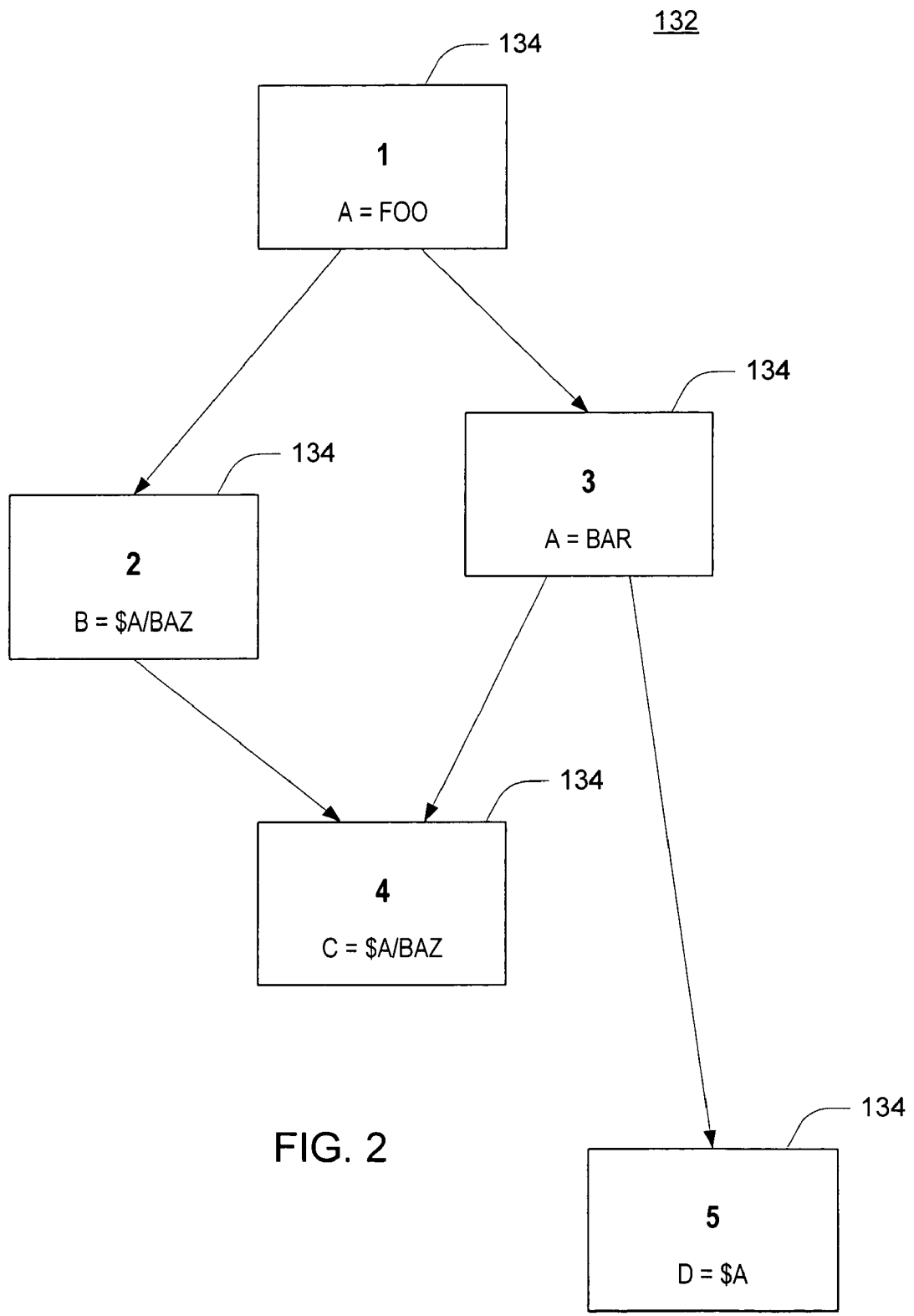
FIG. 2 is a dependency graph.

Referring to FIGS. 2 and 3, in an example of this first approach, a task 1 assigns a value FOO to parameter A, as indicated by the assignment A=FOO. Task manager 110 receives the assigned value, FOO, from task 1 (indicated by the arrow from task 1 to the value cell 324 for parameter A) and stores the value in a value cell 324. The task manager 110 later provides the value FOO to task 2 in order to bind a reference to parameter A in the template for task 2. In this example, task 2 includes an assignment B=$A/BAZ, which can result in the parameter B being assigned the value FOO/BAZ. The task manager 110 receives the assigned value for B which it stores in global context 310. According to graph 132, task 2 executes only after task 1 is completed. Therefore, the assignment of FOO to the parameter A is guaranteed to have been performed prior to the execution of task 2.

In general, groups of multiple tasks of a plan can be executed concurrently. For a particular dependency graph, two or more tasks that are not ordered relative to one another could potentially be executed concurrently or in an unpredictable sequence if there is no direct path between them in the dependency graph. In FIG. 2, tasks 2 and 3 are such unordered tasks. In the example in FIG. 2, task 3 assigns a value of BAR to parameter A. If task 3 executes before task 2, then the parameter B is assigned a value of BAR/BAZ in task 2, while if task 3 executes after task 2, the parameter B is assigned a value of FOO/BAZ.

In a number of applications, the uncertainty of which value will be assigned to B is undesirable. One approach to preventing such a situation is to perform a static checking of a dependency graph and prohibiting use of a plan that exhibits such uncertainty. The check includes identifying groups of tasks that are not ordered by the graph. If a particular parameter is used by one task in the group and assigned by another task in the group, a potential ambiguity occurs. Similarly, if two tasks in such a group assign values to a particular parameter, there is also a conflict. In general, in any group of unordered tasks in which multiple tasks access a particular parameter no task may assign a value to that parameter. This static check would identify the conflict between tasks 2 and 3 with respect to their reference to parameter A. The task management system 100 handles conflicts identified by the static check (e.g., using error handling mechanisms). Note that in this example, tasks 2 and 5 can also execute in an unpredictable order, but both use rather than assign a value of parameter A and therefore do not represent a conflict or ambiguity.

The static checking of the dependency graph is performed by the task manager 110 before execution of the plan or alternatively can be performed in a pre-process by another module that validates the plan specification. In the situation in which the graph is modified by execution of a task, the static check is performed again or augmented to account for the modification of the graph.

For plans that include sub-plans, two variants of this approach can be used. In a first variant, the task manager 110 maintains a single context for all parameters for all levels of sub-plans. In static checking of a plan that includes a node with a sub-plan, an assignment of a parameter by any task in that sub-plan conflicts with any unordered task (with respect to the node with that sub-plan) in the higher-level plan that uses the value of that parameter.

In a second variant involving sub-plans, the task manager 110 maintains a separate context for parameters of each sub-plan, and the specification of a sub-plan explicitly identifies which parameters are exported from the sub-plan to the next higher-level plan when the sub-plan is completed. In such a variant, the static checking involves conflict between an exported parameter of a sub-plan and access to that parameter in a task in the next higher-level plan that is not ordered with execution of the sub-plan.

In another version of this approach, the task manager 110 prohibits repeated assignment of values to any particular global dynamic parameter.

2.2 Approach 2

Figure 4A:
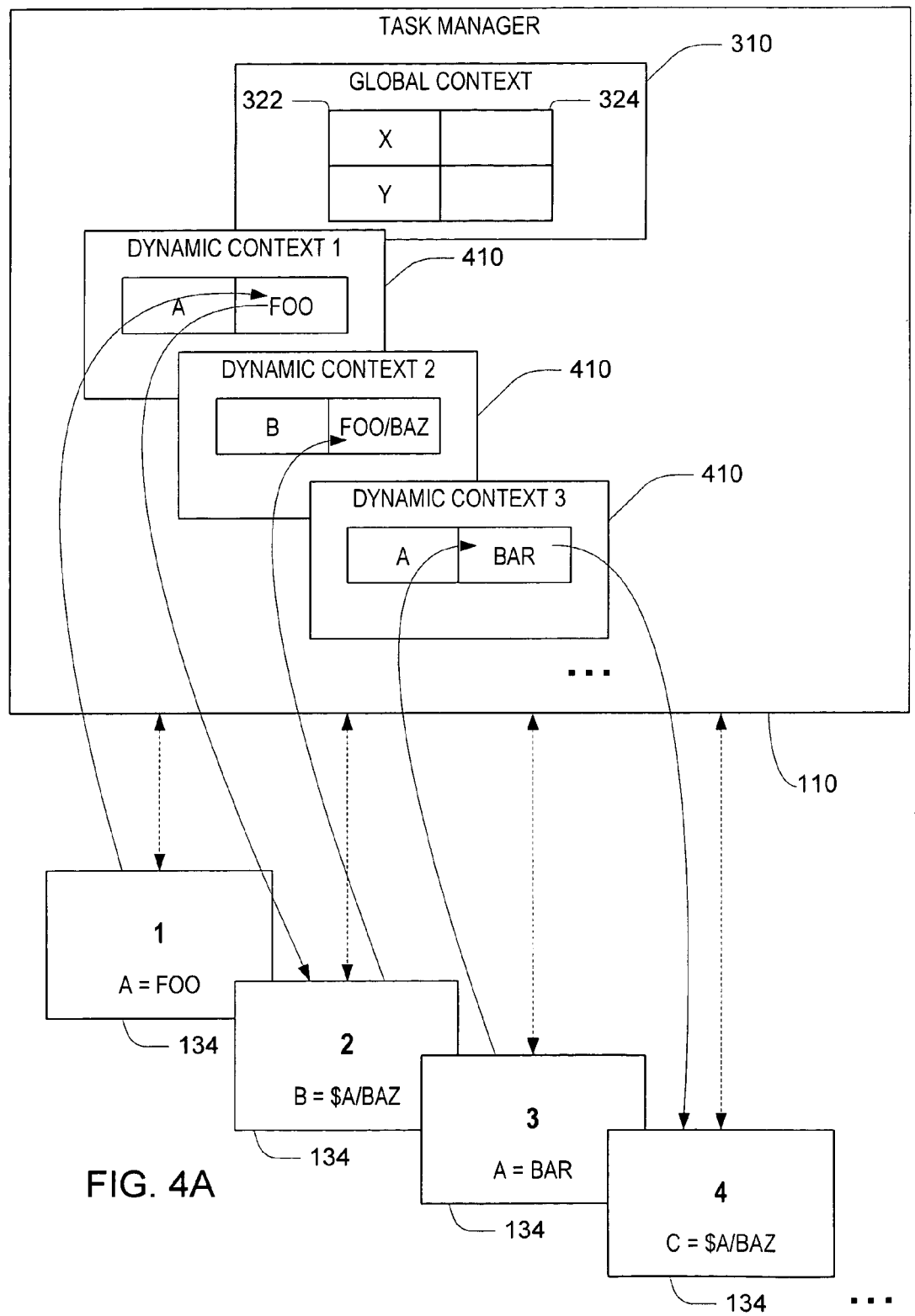
FIG. 4A is a diagram that includes multiple task-specific dynamic contexts in a task manager.

Referring to FIG. 4A, in a second approach task manager 110 maintains a global context 310, for parameters that are set for the plan as a whole, and multiple dynamic contexts 410, each associated with a different node of the dependency graph. Each task that assigns a parameter generates a new "instance" of that parameter and stores (via the task manager 110) the assigned value in the dynamic context 410 associated with the node corresponding to that task. The task manager 110 can therefore store multiple values associated with a parameter, each value associated with a different instance of the parameter. For any particular parameter (e.g., A), the task manager 110 maintains a separate value of the parameter associated with each task in which that parameter is assigned (since each task corresponds to a separate node and a separate dynamic context 410).

Figure 4B:
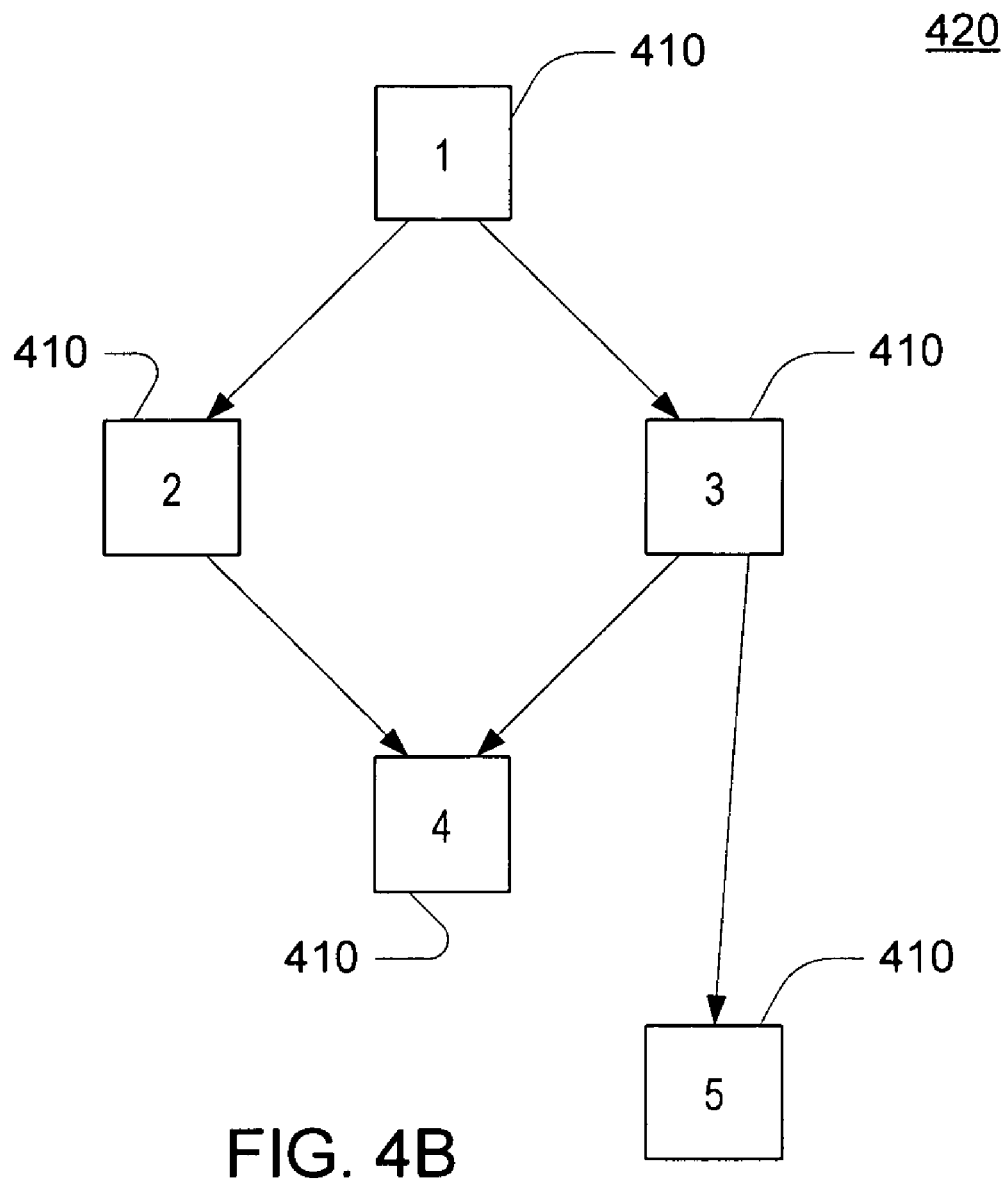
FIG. 4B is a diagram showing the relationships among the dynamic contexts according the dependency graph of FIG. 2.
Figure 4C:
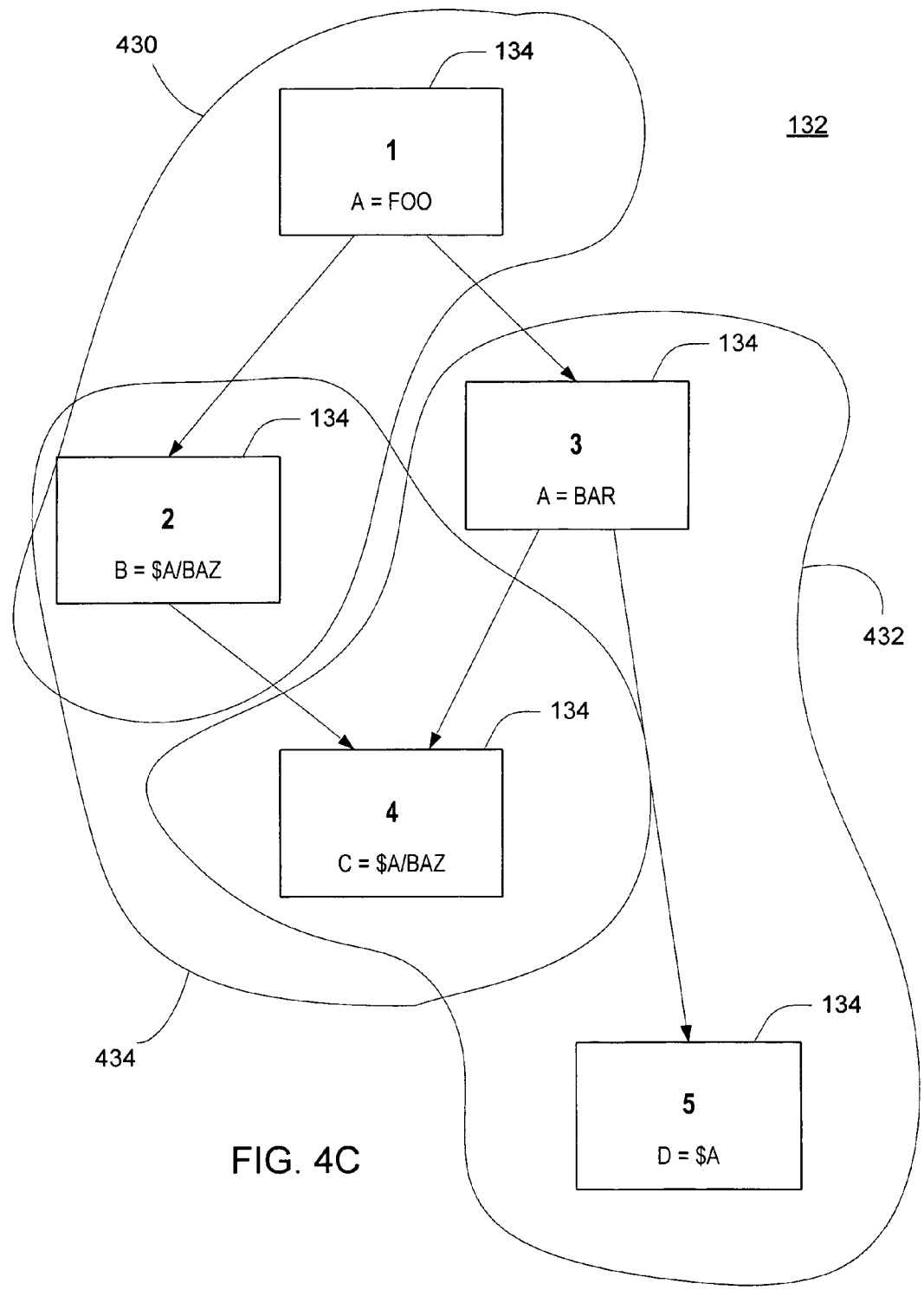
FIG. 4C is a diagram showing scopes of tasks in the dependency graph of FIG. 2.

Referring to FIGS. 4B and 4C, each instance of a parameter and its associated dynamic context 410 has a scope of tasks that determines which tasks "see" the value assigned to that instance. Each dynamic context 410 is associated with a different scope of tasks based on relationships among the dynamic contexts 410 following a pattern 420 according to the dependency graph 132. For example, the instance of parameter A that is assigned A=FOO in task 1 (stored in a dynamic context 410) has a scope of task 430 that is different from the scope of tasks 432 associated with the instance of parameter A that is assigned A=BAR in task 3. The scope of tasks 434 associated with the instance of parameter B that is assigned B=$A/BAZ in task 2 includes task 4 but not task 5. In this approach, the scope of tasks or "scope" of an instance of a parameter (and its associated dynamic context 410) includes only the task that assigned the value to the instance of the parameter and tasks that are ordered after ("downstream of") that task. When a task references a parameter, the task manager 110 binds to that reference a value of an instance of the parameter whose scope includes the task.

When task 1 assigns a value FOO to parameter A, the task manager 110 stores the value in a dynamic context 410 associated with task 1. Similarly, when task 3 assigns a value BAR to parameter A, the task manager 110 stores the value in a dynamic context 410 associated with task 3. Task 2 is within the scope of the instance of parameter A which is assigned a value A=FOO in task 1, but is not in the scope of the instance of parameter A that is assigned A=BAR in task 3. Therefore, under this scoping approach, there is no uncertainty or ambiguity regarding the value of B in task 2. The task manager 110 binds the reference to parameter A in task 2 with the value from the dynamic context 410 for task 1. Task 2 assigns B the valve FOO/BAZ, which it provides to the task manager 110 for storage in the dynamic context 410 associated with task 2.

In general, during execution the task manager 110 binds a value to a reference to a parameter in a task by considering upstream paths (i.e., direct paths through a single arc or indirect paths through already executed tasks) through the graph that terminate with a task that assigns a value to the parameter. In the example, when binding the parameter A in task 2, the task manager 110 follows the upstream path to task 1, where the parameter has been set.

In the example in FIG. 2, task 4 is potentially within the scope of both the instance of parameter A of task 1 and that of task 3. That is, there is an upstream path from task 4 to both task 1 (indirectly through task 2) and to task 3 (directly) each of which assigns a value to A. However, in this example, there is no ambiguity because task 3 is constrained to execute after task 1. If there are multiple upstream assignments of a parameter and if there is one task that is ordered after all the others, then there is no ambiguity and the value assigned to the instance of the parameter in the dynamic context 410 of that last task is used.

As with the first approach, potential ambiguity can be checked statically from the dependency graph. Specifically, for each reference to a parameter at a node (task) in the graph, the upstream tasks that could assign values to the parameter are first identified. If there is no such task, then the parameter would have an undefined value or is provided from a global context for the plan. If there is exactly one upstream task, then there is no ambiguity. If there are multiple upstream tasks that assign values to the parameter there is an ambiguity unless there is a single one of those tasks that is ordered after the others (i.e., constrained to be executed after the other by the dependency graph).

3 Implementation Approaches

Figure 5:
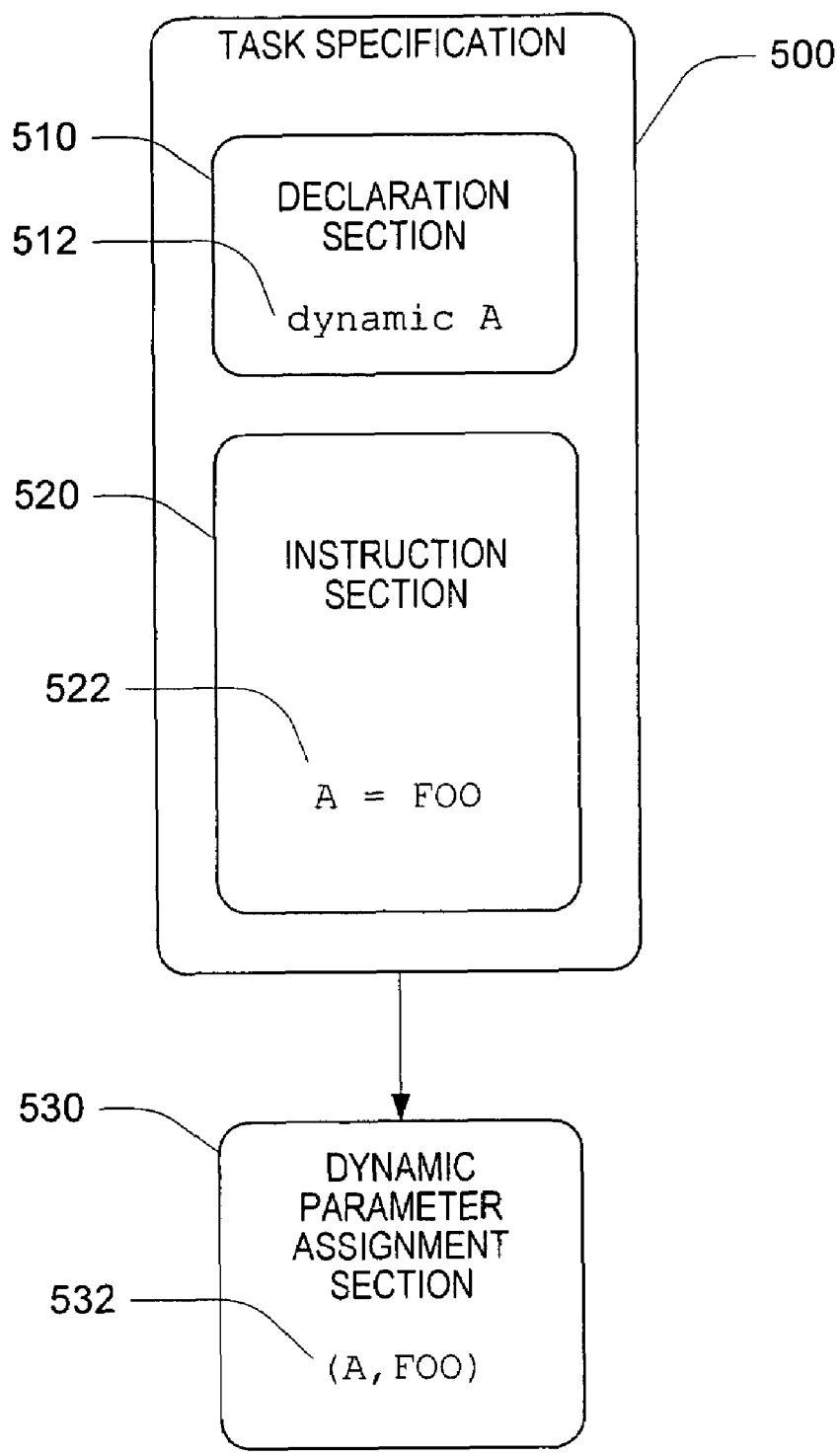
FIG. 5 is a task specification.

Referring to FIG. 5, a task specification 500 (which is contained in tasks specification 124 in FIG. 1) includes a declaration section 510 and an instruction section 520. The declaration section 510 identifies (e.g., using a declaration statement or statements) the dynamic parameters that are assigned through execution of the corresponding task. The task specification shown in FIG. 5 corresponds to task 1 in FIG. 2. The parameter A is declared as being dynamically assigned by the task, illustrated as the declaration "dynamic A" 512. The declaration section 510 also identifies references to parameters that are required to be bound by the task manager 110 according to the scopes of the available parameters.

The instruction section 520 includes computer instruction (e.g., programming language or other procedural statements) for the operations to be carried out by the task, as well as instructions for assigning values to dynamic parameters, such as the instruction "A=FOO" 522. Such computer instruction, for example, can be specified by a user or automatically generated by a computer process.

Task manager 110 is able to process the declaration sections of the task specifications for a plan to determine which parameters are to be assigned, or referenced, or both during execution of the corresponding tasks. The task manager 110 can distinguish between an assignment or a reference by additionally processing the instruction sections of the task specifications, or alternatively, by the use of a separate type of declaration statement for dynamic parameter assignment or reference. For example, for the example shown in FIG. 2, the task manager 110 can parse the task specifications to determine that task 2 references parameter A while task 3 assigns a value to A. This allows the task manager 110 to perform a static check, such as a static check for the first approach (see FIG. 3) in which the reference in task 2 and the assignment in task 3 would conflict.

When the declaration section identifies the parameters that are to be referenced, the task manager 110 is able to assemble an environment of parameters and their bound values prior to executing the instructions of instruction section 520. Having assembled the environment for a task, the task manager 110 invokes a process that executes the instructions of the instruction section of the task specification. That process then accesses the parameter values from the environment that has been created for it. During execution, processing of an assignment instruction for a dynamic parameter results in a (parameter,value) pair being recorded in an output of the task execution, a dynamic parameter assignment section 530. For example, the pair (A,FOO) 532 would be recorded in the assignment section 530. The task manager 110 receives the assignment section 530 after execution of the instructions of the instruction section 520, and uses its contents to update the parameter values.

In one specific implementation of this approach, the instruction section includes statements in a shell scripting language such as "ksh." Prior to invoking a shell process to interpret the instructions, the task manager 110 uses the declaration section 510 to assemble an environment of parameter values that will be used in processing the shell instructions. In this implementation, assignment statements take the form of output statements to the text output of the script. That is, rather than using an assignment "A=FOO", the scripting instructions would include a statement such as "PRINT A=FOO", resulting in a line "A=FOO" being output. The text output of the script forms the dynamic parameter assignment section 530. The task manager 110 receives the text output, and interprets the assignment statements storing the values in the appropriate dynamic contexts 410.

In another implementation, the process interpreting the instructions in instruction section 520 is in communication with the task manager 110, and the task manager 110 services requests to store or to access values of dynamic parameters. When a parameter reference needs to be bound to a value to execute an instruction, the process sends a request to the task manager 110, which determines the appropriate dynamic context 410 for that parameter and returns the value in that dynamic context 410. Similarly, when a parameter is assigned a value, the process sends a request to store the value in the appropriate dynamic context 410.

In an alternative implementation, task specification 500 declaration section 510 does not identify the parameters that will be needed by the task during execution, and a suitable communication mechanism is not available to request the parameter values while the instructions of the task are being executed. In this implementation, the task manager 110 assembles a complete list of all parameter instances whose scopes include the task. For parameters for which binding would cause a potential ambiguity (for example because the parameter was assigned a value by multiple upstream unordered tasks), the parameter value is replace with an indicator, such as "ambiguous_value", so that an error would occur should that parameter be referenced in the task.

When the declaration sections 510 do not include declarations of the parameters that will be dynamically assigned and/or referenced in each task, static checking of a dependency graph may not be possible. However, the task manager 110 is still able to identify some potential conflicts that may occur during execution of a plan. For example, using the scoping approach with a single global context (see FIG. 3), if the task manager 110 detects during execution of a plan that multiple unordered tasks have assigned values to a parameter, the task manager 110 can identify the potential conflict. The task management system 100 can then handle conflicts identified by the task manager.

4 EXAMPLES

Figure 6A:
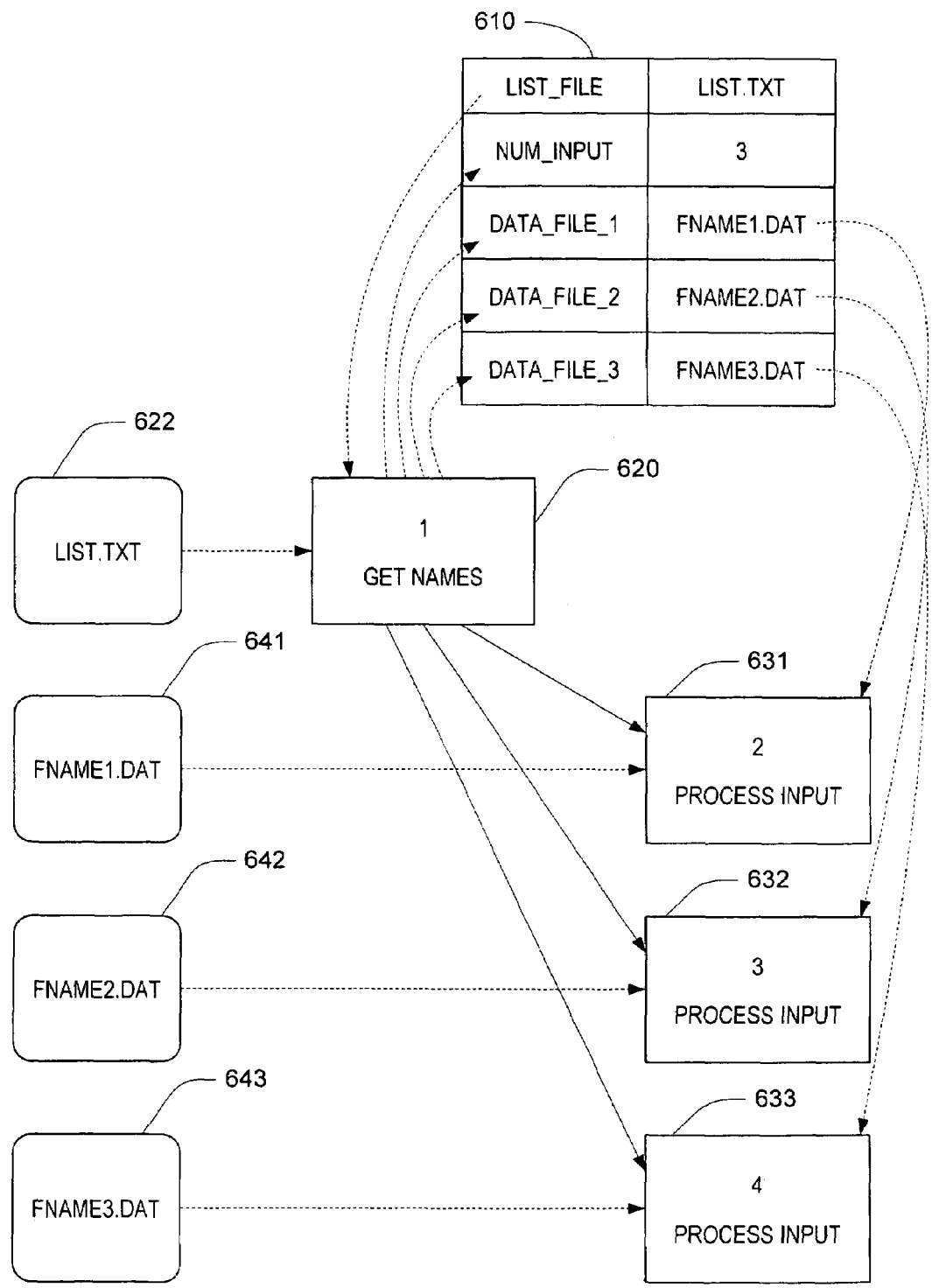
FIGS. 6A-B are examples of an application that uses dynamic parameters.

Referring to FIG. 6A, an example of use of dynamically assigned parameters involves the processing of a number of data files 641-643, each by a different task 631-633 in an overall plan. The file names of the data files 641-643 are not known when the plan is first executed. Rather, the file names are listed in a text file 622, the name of which is provided as a global parameter LIST_FILE for the overall plan.

The plan includes a first task 620, which is responsible for opening the LIST_FILE file 622, and reading its contents. This task 620 opens the file and reads the contents, determining the number of separate data files listed. In this example, the list file 622 has three file names, FNAME1.DAT, FNAME2.DAT, and FNAME3.DAT. The task retrieves the listed files 641-643, for example, using a file transfer protocol across a data network. Task 1 assigns values to a number of dynamic parameters, NUM_INPUT, and DATA_FILE_1 through DATA_FILE_3, and passes this assignment information to the task manager 110 which records it in an appropriate context 610 (e.g., a global context, or a dynamic context associated with task 1, depending on the scoping approach used).

In this first version of the example, the initially specified plan has exactly three instances of tasks for processing the input files, tasks 2-4 (631-633). Each task retrieves the name of its corresponding input data file by referencing a dynamic parameter assigned by task 1.

A variant of this example takes advantage of tasks being able to modify the plan specification. The plan initially has only a single task, the GET NAMES task 1 (620). After the GET NAMES task has determined that there are three data files to process, the task makes use of services of the task manager 110 to create the three processing tasks 631-633 and connect them to itself (task 1). Then after task 1 completes, the task manager 110 executes the newly-created tasks 631-633 as described above.

Figure 6B:
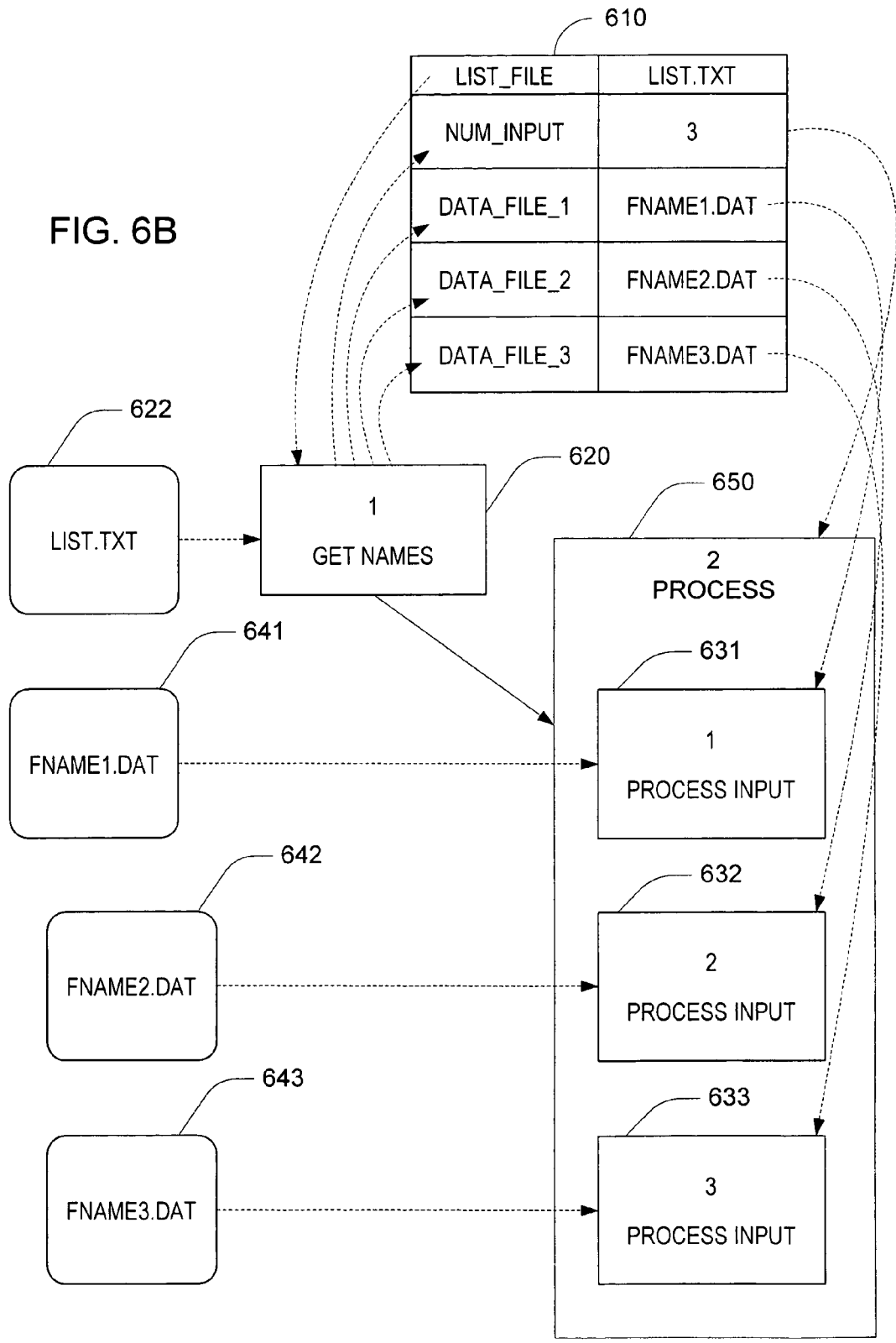

Alternatively, in another variant of this example, the task manager 110 can use a plan template having a modifiable number of tasks. Referring to FIG. 6B, the plan initially has two tasks, the GET NAMES task 1 (620), and a PROCESS task 2 (650). After the GET NAMES task has determined that there are three data files to process, the PROCESS task creates a sub-plan using a plan template having a modifiable number of tasks. The PROCESS task references the dynamic parameter NUM_INPUT to create a sub-plan with three (unordered) processing tasks 631-633. The task manager 110 executes the tasks 631-633 in the newly-created sub-plan as described above.

The parameter scoping approach described above can be implemented using software for execution on a computer. For instance, the software forms procedures in one or more computer programs that execute on one or more programmed or programmable computer systems (which may be of various architectures such as distributed, client/server, or grid) each including at least one processor, at least one data storage system (including volatile and non-volatile memory and/or storage elements), at least one input device or port, and at least one output device or port. The software may form one or more modules of a larger program, for example, that provides other services related to the design and configuration of computation graphs.

The software may be provided on a medium, such as a CD-ROM, readable by a general or special purpose programmable computer or delivered (encoded in a propagated signal) over a network to the computer where it is executed. All of the functions may be performed on a special purpose computer, or using special-purpose hardware, such as coprocessors. The software may be implemented in a distributed manner in which different parts of the computation specified by the software are performed by different computers. Each such computer program is preferably stored on or downloaded to a storage media or device (e.g., solid state memory or media, or magnetic or optical media) readable by a general or special purpose programmable computer, for configuring and operating the computer when the storage media or device is read by the computer system to perform the procedures described herein. The inventive system may also be considered to be implemented as a computer-readable storage medium, configured with a computer program, where the storage medium so configured causes a computer system to operate in a specific and predefined manner to perform the functions described herein.

It is to be understood that the foregoing description is intended to illustrate and not to limit the scope of the invention, which is defined by the scope of the appended claims. Other embodiments are within the scope of the following claims.

What is claimed is:

1. A method performed by a computer system, the method including:
   defining a plurality of tasks according to a dependency graph;
   maintaining a plurality of parameter contexts, each associated with a different scope of the tasks;
   binding a value to a first parameter used in a first of the tasks, including identifying a first of the parameter contexts according to the dependency graph and retrieving the value for the parameter from the identified context;
   determining a value for assignment to the first parameter during execution of a second of the tasks; and
   storing the value for the first parameter in the first parameter context;
   wherein the first parameter context is associated with the second of the tasks.

2. The method of claim 1 wherein the dependency graph specifies an execution order for the tasks, and wherein identifying the first of the contexts includes identifying tasks that necessarily execute prior to the first of the tasks.

3. The method of claim 2 wherein identifying the first of the contexts includes identifying tasks that assign a value to the first parameter.

4. The method of claim 3 wherein identifying tasks that assign a value to the first parameter includes identifying a task that executes latest according to the dependency graph.

5. The method of claim 1 wherein multiple instances of a given parameter are each associated with a different one of the parameter contexts.

6. The method of claim 5 wherein the multiple instances of a given parameter are each assigned a value by a different task.

7. The method of claim 1 wherein the first of the tasks and a second of the tasks are associated with a first of the different scopes.

8. The method of claim 1 wherein the first of the tasks is associated with a first of the different scopes and a second of the different scopes.

9. The method of claim 8 wherein the first of the different scopes is associated with a second of the tasks and the second of the different scopes is associated with a third of the tasks.

10. The method of claim 8 wherein the first of the scopes and the second of the scopes is associated with a second of the tasks.

11. Software stored on a computer-readable storage medium including instructions for causing a computer system to:
    define a plurality of tasks according to a dependency graph;
    maintain a plurality of parameter contexts, each associated with a different scope of the tasks;
    bind a value to a first parameter used in a first of the tasks, including identifying a first of the parameter contexts according to the dependency graph and retrieving the value for the parameter from the identified context;
    determine a value for assignment to the first parameter during execution of a second of the tasks; and
    store the value for the first parameter in the first parameter context;
    wherein the first parameter context is associated with the second of the tasks.

12. The software of claim 11 wherein the dependency graph specifies an execution order for the tasks, and wherein identifying the first of the contexts includes identifying tasks that necessarily execute prior to the first of the tasks.

13. The software of claim 12 wherein identifying the first of the contexts includes identifying tasks that assign a value to the first parameter.

14. The software of claim 13 wherein identifying tasks that assign a value to the first parameter includes identifying a task that executes latest according to the dependency graph.

15. A task managing computer system including at least one processor and at least one storage system, the computer system including:
    a task manager definition module configured to execute on the at least one processor to define a plurality of tasks according to a dependency graph;
    a task manager dynamic context module configured to maintain storage space in the at least one storage system to maintain a plurality of parameter contexts, each associated with a different scope of the tasks; and
    a task manager parameter binding module, having access to the parameter contexts, configured to execute on the at least one processor to bind a value to a first parameter used in a first of the tasks, including identifying a first of the parameter contexts according to the dependency graph and retrieving the value for the parameter from the identified context, and further configured to determine a value for assignment to the first parameter during execution of a second of the tasks, and store the value for the first parameter in the first parameter context;
    wherein the first parameter context is associated with the second of the tasks.

16. The system of claim 15 wherein the dependency graph specifies an execution order for the tasks, and wherein identifying the first of the contexts includes identifying tasks that necessarily execute prior to the first of the tasks.

17. The system of claim 16 wherein identifying the first of the contexts includes identifying tasks that assign a value to the first parameter.

18. The system of claim 17 wherein identifying tasks that assign a value to the first parameter includes identifying a task that executes latest according to the dependency graph.

19. A task managing computer system including at least one processor and at least one storage system, the computer system including:
    means for defining a plurality of tasks according to a dependency graph; means for maintaining a plurality of parameter contexts, each associated with a different scope of the tasks;
    means for binding a value to a first parameter used in a first of the tasks, including identifying a first of the parameter contexts according to the dependency graph and retrieving the value for the parameter from the identified context;
    means for determining a value for assignment to the first parameter during execution of a second of the tasks; and means for storing the value for the first parameter in the first parameter context;

wherein the first parameter context is associated with the second of the tasks.

20. The system of claim 19 wherein the dependency graph specifies an execution order for the tasks, and wherein identifying the first of the contexts includes identifying tasks that necessarily execute prior to the first of the tasks.

21. The system of claim 20 wherein identifying the first of the contexts includes identifying tasks that assign a value to the first parameter.

22. The system of claim 21 wherein identifying tasks that assign a value to the first parameter includes identifying a task that executes latest according to the dependency graph.

* * * * *

UNITED STATES PATENT AND TRADEMARK OFFICE
CERTIFICATE OF CORRECTION

| | | |
|---|---|---|
| PATENT NO. | : 7,594,227 B2 | |
| APPLICATION NO. | : 10/795374 | |
| DATED | : September 22, 2009 | |
| INVENTOR(S) | : Inchingolo et al. | |

It is certified that error appears in the above-identified patent and that said Letters Patent is hereby corrected as shown below:

On the Title Page:

The first and sole Notice should read --

Subject to any disclaimer, the term of this patent is extended or adjusted under 35 U.S.C. 154(b) by 1544 days.

Signed and Sealed this

Twenty-eighth Day of September, 2010

David J. Kappos
*Director of the United States Patent and Trademark Office*